United States Patent
Nishi et al.

(10) Patent No.: US 12,474,196 B2
(45) Date of Patent: Nov. 18, 2025

(54) DISTRIBUTION SUPPLY APPARATUS AND COMBINATION WEIGHING APPARATUS INCLUDING THE SAME

(71) Applicant: Ishida Co., Ltd., Kyoto (JP)

(72) Inventors: Michio Nishi, Ritto (JP); Mikio Kishikawa, Ritto (JP); Toshiharu Kageyama, Ritto (JP); Satoru Kamigaito, Ritto (JP); Takahide Kasugai, Ritto (JP); Kazuteru Oda, Ritto (JP); Hidemasa Cho, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 155 days.

(21) Appl. No.: 18/595,858

(22) Filed: Mar. 5, 2024

(65) Prior Publication Data

US 2024/0302200 A1    Sep. 12, 2024

(30) Foreign Application Priority Data

Mar. 7, 2023   (JP) ................... 2023-034828

(51) Int. Cl.
   *G01G 13/22*   (2006.01)
   *G01G 13/02*   (2006.01)
   *G01G 21/12*   (2006.01)

(52) U.S. Cl.
   CPC ........... *G01G 13/22* (2013.01); *G01G 13/026* (2013.01); *G01G 21/12* (2013.01)

(58) Field of Classification Search
   CPC ....... G01G 13/22; G01G 13/026; G01G 21/12
   See application file for complete search history.

(56) References Cited

U.S. PATENT DOCUMENTS

| | | | | |
|---|---|---|---|---|
| 5,270,495 A | * | 12/1993 | Mosher | G01G 19/393 177/25.18 |
| 2009/0260896 A1 | | 10/2009 | Fujii | |
| 2014/0054133 A1 | * | 2/2014 | Hansen | B65G 47/46 198/418.1 |
| 2017/0211967 A1 | * | 7/2017 | Otoshi | G01G 13/026 |
| 2019/0368917 A1 | * | 12/2019 | Broager | G01G 13/06 |

(Continued)

FOREIGN PATENT DOCUMENTS

| | | |
|---|---|---|
| JP | 2007-114185 A | 5/2007 |
| JP | 2018-155636 A | 10/2018 |

*Primary Examiner* — Jeremy Carroll
(74) *Attorney, Agent, or Firm* — Studebaker Brackett PLLC

(57) ABSTRACT

A distribution supply apparatus includes: a distributor configured to receive articles dropped from above and distribute the articles circumferentially; a plurality of conveyors arrayed radially along a circumferential edge of the distributor, the plurality of conveyors each being configured to convey, in a direction away from the distributor, an article received from among the articles from the distributor; a support shaft extending vertically and upward from substantially a center of the distributor; a plate configured to change, in contact with each of the articles to fall, a falling direction of each of the articles; a universal joint coupling a center of the plate and a leading end portion of the support shaft; and a regulator configured to regulate an angle of inclination of the plate that slants based on the universal joint, within a range from an angle at which the plate is horizontal to an angle at which each of the articles falls from the plate in a sliding manner.

4 Claims, 5 Drawing Sheets

(56) References Cited

U.S. PATENT DOCUMENTS

2020/0072655 A1* 3/2020 Konishi ............... G01G 19/393
2022/0018705 A1* 1/2022 Ingemann Hansen ....................... G01G 19/393

* cited by examiner

DISTRIBUTION SUPPLY APPARATUS AND COMBINATION WEIGHING APPARATUS INCLUDING THE SAME

CROSS-REFERENCE TO RELATED APPLICATIONS

This application is based upon and claims the benefit of priority from Japanese Patent Application No. 2023-034828 filed on Mar. 7, 2023 in Japan, the entire contents of which are incorporated herein by reference.

TECHNICAL FIELD

The present invention relates to a distribution supply apparatus and a combination weighing apparatus including the distribution supply apparatus.

BACKGROUND ART

In order to weigh articles high in adhesion, such as disassembled broilers, in combination, as disclosed in JP 2018-155636 A, since a slanted disk is secured to the top of a distribution table on the upper side of an apparatus, broilers dropped from above hit against the slanted disk and then are distributed to peripheral radial feeders RF.

The distribution table rotates around a vertical axis passing through the top at the center. Therefore, the slanted disk rotates together with the distribution table. Thus, broilers dropped from above the slanted disk hit against the slanted disk and then fall to the circumferential edge of the distribution table. Then, due to the rotation of the distribution table, the broilers having fallen to the circumferential edge of the distribution table are discharged to any radial feeders filled with no broiler.

SUMMARY OF INVENTION

However, since the slanted disk rotates together with the distribution table, the slanted disk is difficult to orient to any empty space on the distribution table. As a result, only control to rotate the distribution table or stop the rotation of the distribution table has difficulty in distributing fallen broilers evenly to the circumferential edge of the distribution table, leading to a problem.

When a flat expanded broiler, such as a thigh or a breast, adheres to the slanted disk and then a fallen broiler hits against the flat expanded broiler, the broilers are discharged together to the distribution table. Thus, such broilers are overlaid with each other on the distribution table. Due to the overlay, as a problem, temporarily, broilers are difficult to supply to a radial feeder having a small supply.

In order to solve such problems, for example, required is a method of controlling the position at which a distribution table stops such that a slanted disk is oriented to a radial feeder having a small supply, according to the invention disclosed in FIG. 6 in JP 2007-114185 A. Alternatively, a slanted disk and a distribution table require rotating by respective different motors such that the slanted disk is oriented to any empty space on the distribution table. However, such configurations not only need an intricate structure but also require, for example, a camera to capture such an empty space or a radial feeder, leading to an increase in cost as a problem.

The present invention has been made in order to solve such problems and an object of the present invention is to provide a novel distribution supply apparatus having a simple configuration and capable of distributing randomly fallen articles to the periphery of a slanted disk, and a combination weighing apparatus including the distribution supply apparatus.

A first aspect of the present invention is summarized as a distribution supply apparatus including: a distributor configured to receive articles dropped from above and distribute the articles circumferentially; a plurality of conveyors arrayed radially along a circumferential edge of the distributor, the plurality of conveyors each being configured to convey, in a direction away from the distributor, an article received from among the articles from the distributor; a support shaft extending vertically and upward from substantially a center of the distributor; a plate configured to change, in contact with each of the articles to fall, a falling direction of each of the articles; a universal joint coupling a center of the plate and a leading end portion of the support shaft; and a regulator configured to regulate an angle of inclination of the plate that slants based on the universal joint, within a range from an angle at which the plate is horizontal to an angle at which each of the articles falls from the plate in a sliding manner.

In the distribution supply apparatus, the falling position for articles carried by, for example, a conveyor belt is set such that the articles fall to substantially the center of the distributor. Thus, when an article falls onto the plate located at substantially the center of the distributor, the plate supported by the universal joint varies its orientation and slant depending on the place against which the article hits. Thus, even when articles fall one after another, each article is oriented to a different direction. Thus, the articles dropped from above are each distributed to an arc around the support shaft. Therefore, the plate does not require rotating by, for example, a motor, independently of the distributor. Thus, with a reduction in cost, articles can be distributed to the circumferential edge of the distributor.

A second aspect of the present invention is summarized as the above distribution supply apparatus further including a second support shaft attached parallel to the plate, the second support shaft extending in a direction intersecting the support shaft, wherein the support shaft rotates together with the distributor around an axis of the support shaft, the universal joint includes a spherical sliding bearing, and the second support shaft is supported by the spherical sliding bearing.

Thus, when the support shaft extending vertically rotates in the horizontal plane, the second support shaft extending in the direction intersecting the support shaft rotates around the support shaft extending vertically. Simultaneously, the plate attached parallel to the second support shaft turns around the second support shaft. Thus, the plate varies in orientation not only in response to a hit with an article but also in response to rotation of the distributor. Even when articles fall randomly, each article is oriented to any direction, so that the articles are distributed annularly around the support shaft.

A third aspect of the present invention is summarized as the above distribution supply apparatus wherein the regulator includes: a cylinder through which the support shaft is inserted, the cylinder housing the universal joint, the cylinder having an upper end edge configured to regulate a slant of the plate in contact with the plate; and a bottom occluding a lower opening of the cylinder.

Thus, since the universal joint movable is housed in the cylinder, even in a case where the universal joint abrades, the universal joint can be kept inside the cylinder, leading to prevention of the universal joint from falling to the distributor. Therefore, the distribution supply apparatus can be provided to the market as a food processor that inhibits contamination with foreign matter.

A fourth aspect of the present invention is summarized as a combination weighing apparatus including the above distribution supply apparatus on an upper side of the combination weighing apparatus, wherein each of the plurality of conveyors includes a screw feeder including a screw, the screw feeder being configured to rotate the screw to convey the article or includes a vibration feeder including a trough, the vibration feeder being configured to vibrate the trough to convey the article.

The plurality of conveyors of the distribution supply apparatus is disposed one-to-one to a plurality of pool hoppers of the combination weighing apparatus. Thus, to the market, provided can be the combination weighing apparatus that is of a special type, for example, specialized in broilers and is inexpensive with a reduction in cost.

According to the present invention, a distribution supply apparatus enables changes in the orientation and slant of a plate due to a hit of a fallen article to the plate without a configuration in which the orientation of the plate is changed actively by a motor or the like. Thus, the distribution supply apparatus low in cost can be provided to the market.

DESCRIPTION OF EMBODIMENTS

Embodiments of the present invention will be described below based on the drawings. Note that the drawings are schematic and thus the parts are different in dimensions or ratio from the realities. In addition, parts between each drawing may be different in dimensions or ratio. Furthermore, in the present specification and the drawings, constituents substantially identical in function or configuration are denoted with the same reference signs and thus duplicate description thereof will be omitted. In addition, any constituents not directly related to the present invention are not illustrated.

<Entire Configuration>

Figure 1:
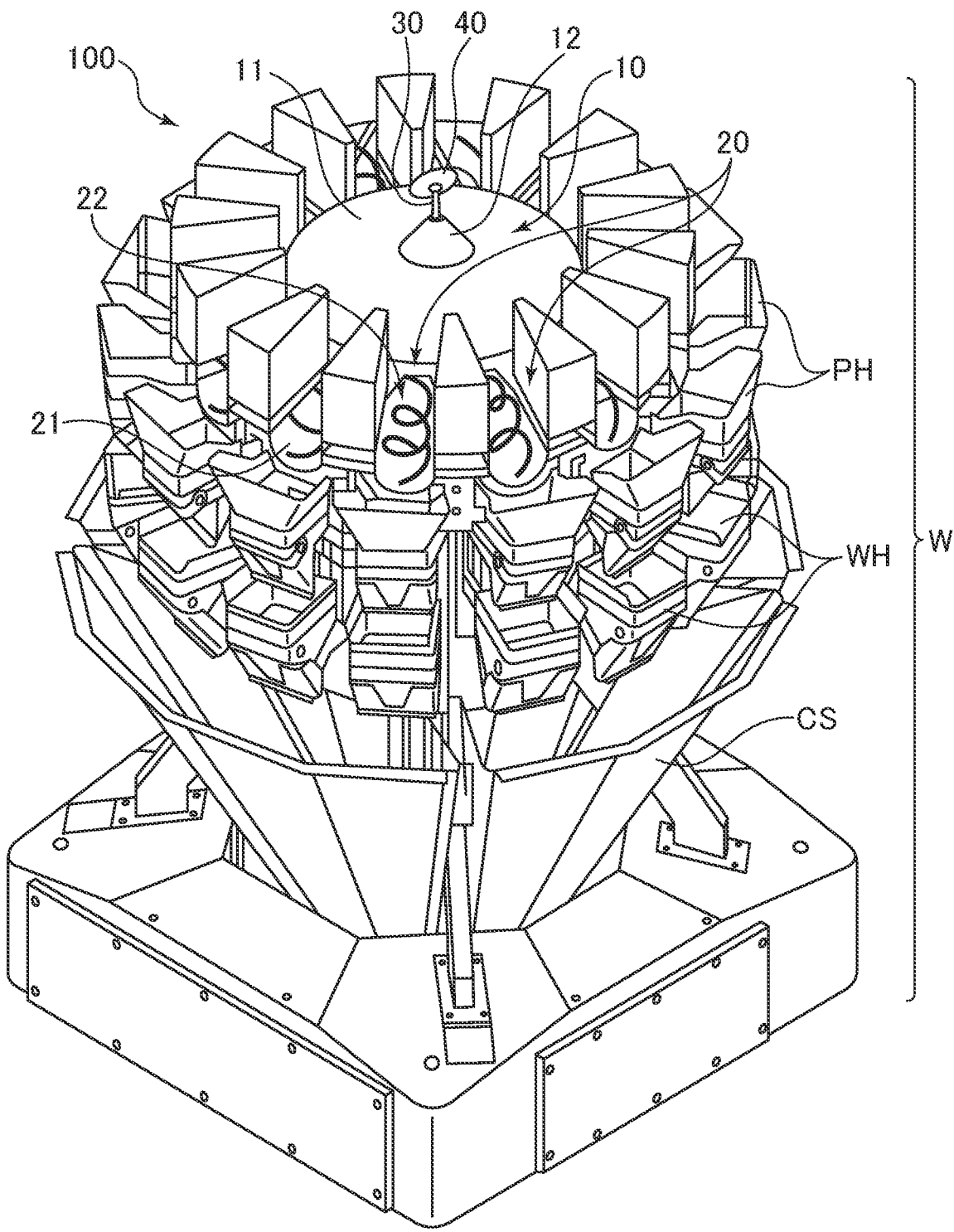
FIG. 1 is an external perspective view of a combination weighing apparatus according to an embodiment of the present invention.
Figure 2:
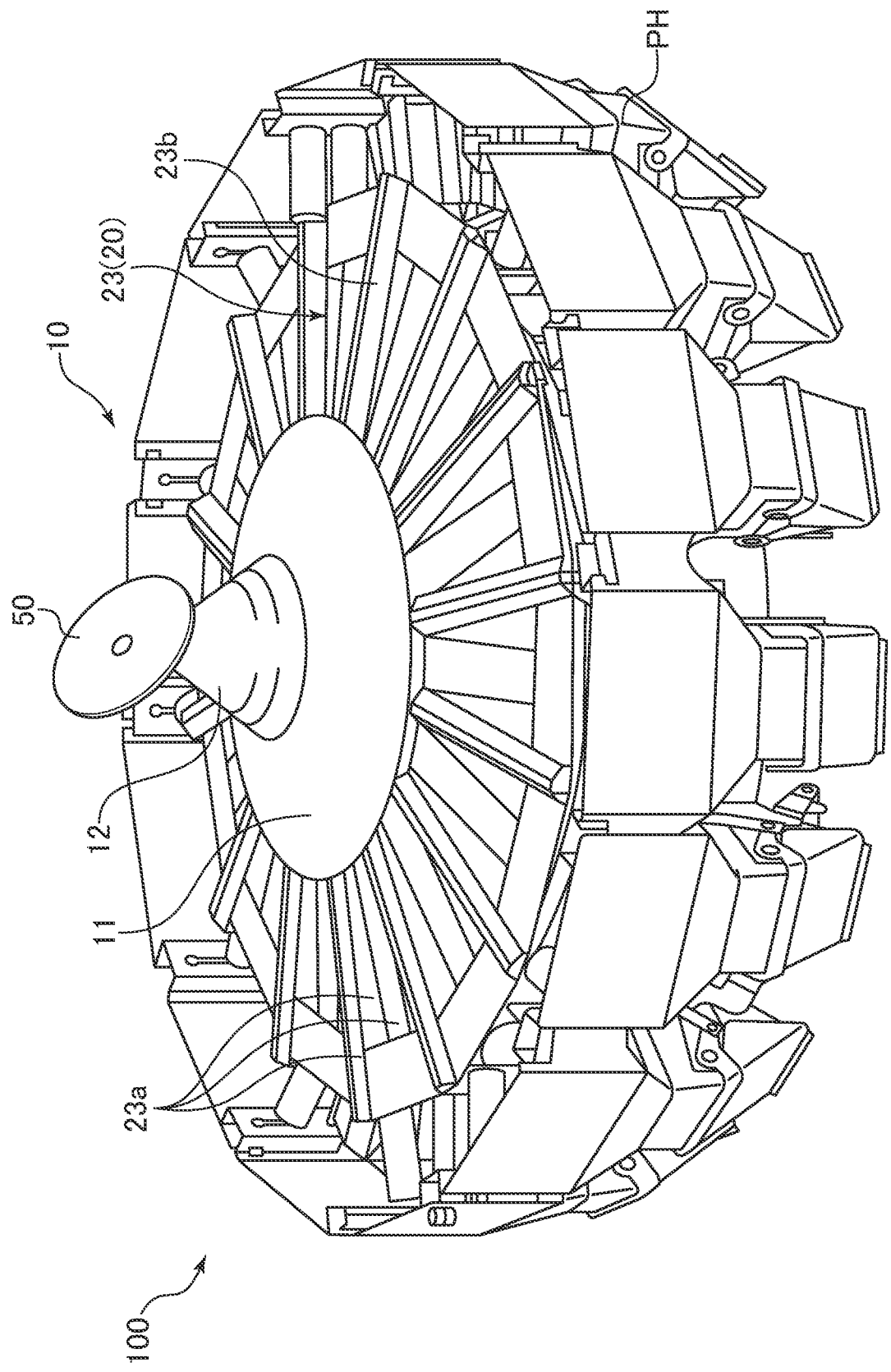
FIG. 2 is an external perspective view of a distribution supply apparatus according to another embodiment.

FIG. 1 is an external perspective view of the entire configuration of a combination weighing apparatus W according to an embodiment of the present invention. FIG. 2 is an external perspective view of an exemplary distribution supply apparatus 100 according to another embodiment disposed on the upper side of the combination weighing apparatus W.

Referring to FIGS. 1 and 2, the combination weighing apparatus W includes a distribution supply apparatus 100 provided on its upper side, a plurality of pool hoppers PH disposed below the distribution supply apparatus 100, a plurality of weighing hoppers WH that is disposed below the plurality of pool hoppers PH and is identical in number to the plurality of pool hoppers PH, and a collecting chute CS disposed below the plurality of weighing hoppers WH. Such a configuration is publicly known, and thus the weighing hoppers WH and the collecting chute CS below the pool hoppers PH are not illustrated in FIG. 2. For example, the pool hoppers PH, the weighing hoppers WH, and the collecting chute CS illustrated in FIG. 1 are publicly known in configuration, and thus detailed descriptions thereof will be omitted herein.

Referring to FIGS. 1 and 2, the distribution supply apparatus 100 includes a distributor 10 at its center and a plurality of conveyors 20 arrayed radially along the circumferential edge of the distributor 10. The distributor 10 includes a distribution table 11 gently frustoconical in shape, a driver not illustrated that rotates the distribution table 11 around a vertical axis, a truncated cone 12 attached to the center of the distribution table 11, and a plate 50 attached to the top of the truncated cone 12 through a support shaft 30.

The conveyors 20 illustrated in FIG. 1 each serve as a screw feeder including a trough 21, of which the cross section is U-shaped, and a screw 22 that rotates inside the trough 21. The screw feeder is suitable to conveyance of blockish articles. However, for flat articles, such as thighs or breasts, such a vibration trough 23 as illustrated in FIG. 2 is adopted.

Vibration troughs 23 illustrated in FIG. 2 each have an article conveyance face 23a on which a plurality of small projections is arrayed all over in a brick pattern, in which each small projection has an upward slope to the downstream pool hopper PH and is shaped like a rectangle in plan view and a right-angled triangle in side view. The article conveyance face 23a conveys articles downstream due to an electromagnetic vibrator (not illustrated) and a four-bar linkage spring mechanism (not illustrated). The plurality of vibration troughs 23 arrayed radially is overlapped one on another at adjacent portions 23b in a non-contact manner. Thus, the vibration troughs 23 serve collectively as a single receiver, so that an article having jumped after hitting against the plate 50 can be received by any of the vibration troughs 23.

Figure 3:
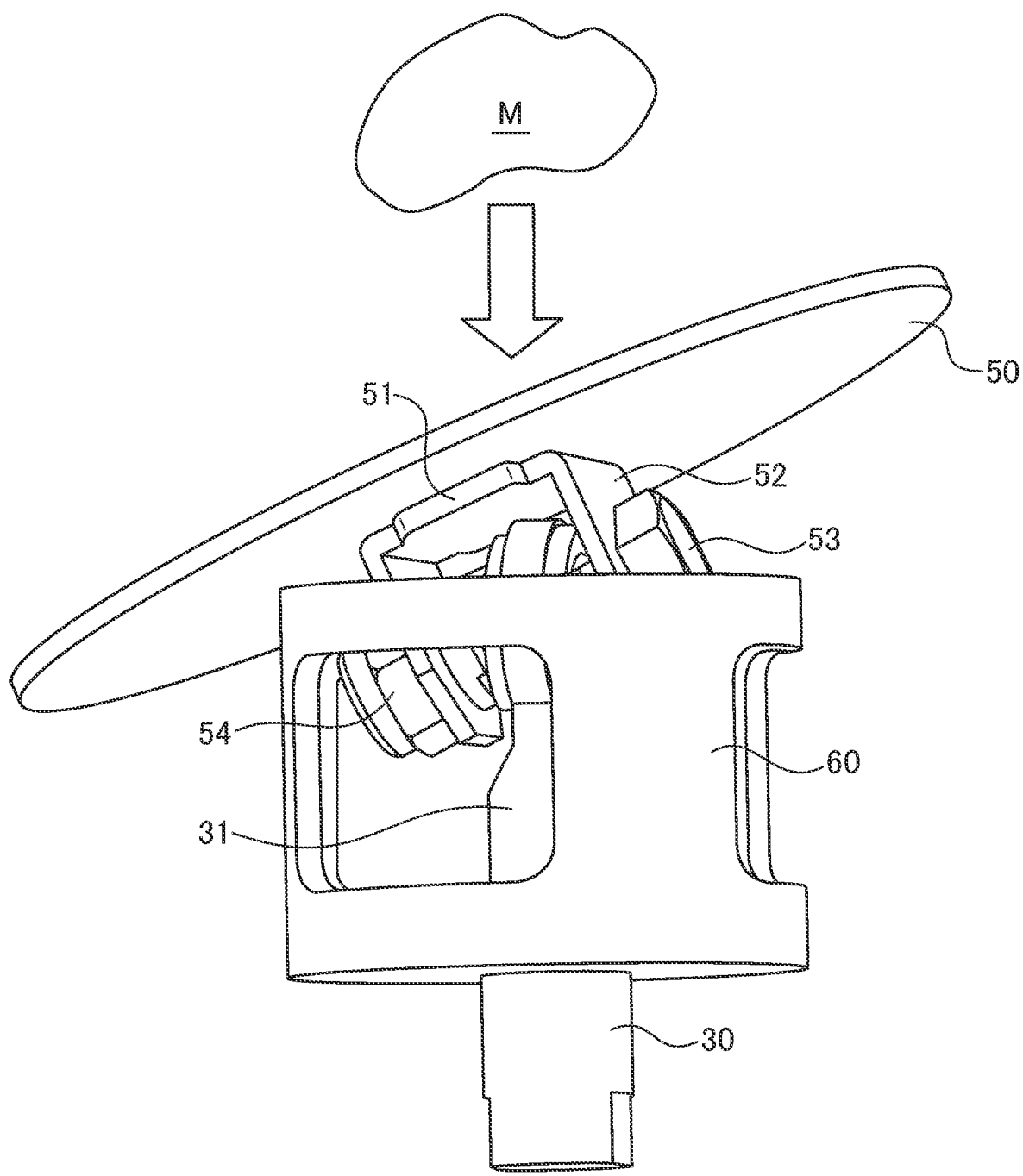
FIG. 3 is an external perspective view of the entire attachment structure of a plate.
Figure 4:
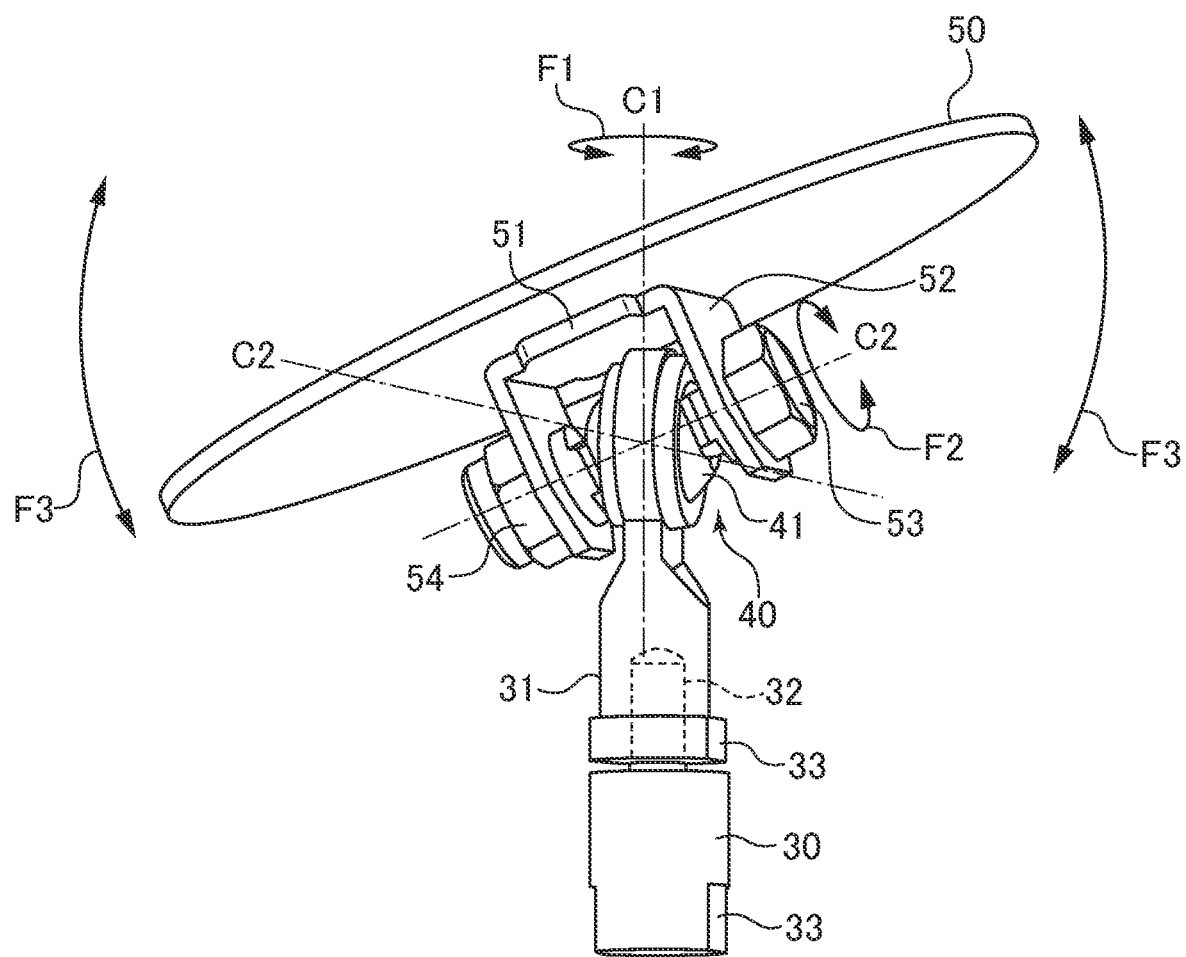
FIG. 4 is an external perspective view illustrating a state where a regulator is removed from the attachment structure in FIG. 3.

FIG. 3 illustrates an exemplary attachment structure of the plate 50 for attachment onto the truncated cone 12 on the distribution table 11. FIG. 4 is an external perspective view illustrating a state where a regulator 60, described later, in FIG. 3 is removed. Referring to FIGS. 3 and 4, the support shaft 30 has a leading end portion on which a rod end 31 is screwed. The rod end 31 has a leading end portion to which a universal joint 40 is assembled. The plate 50 is coupled to the universal joint 40. The regulator 60 that regulates the slant of the plate 50 is attached below the plate 50.

The plate 50 is made of a stainless disk having a size, for example, a diameter of approximately 15 to 20 cm such that the orientation of the plate 50 varies when an article M dropped from above hits against the plate 50. A bracket 51 that is U-shaped in side view is welded to the center of the back face of the plate 50 such that the bracket 51 has opposed side faces 52 perpendicular to the back face of the plate 50.

The universal joint 40 has a spherical sliding bearing 41 disposed between the side faces 52 perpendicular to the back face of the plate 50. A bolt 53 inserted through the spherical sliding bearing 41 and the respective through holes of the side faces 52 is secured with a nut 54. Therefore, the bolt 53 serves as a pivot (second support shaft) that causes the plate 50 to slant. The bolt 53 extends in a direction intersecting the support shaft 30 extending vertically. Thus, when the support shaft 30 extending vertically rotates in an arrow direction F1 around its axis C1, the bolt 53 serving as the second support shaft rotates in the arrow direction F1 around the axis C1 of the support shaft 30. Note that the bolt 53 serving as the second support shaft is attached parallel to the plate 50.

The spherical sliding bearing 41 of the universal joint 40 turns in an arrow direction F2 around the axis C2 of the bolt 53 while supporting the bolt (second support shaft) 53 and simultaneously swings in an arrow direction F3 around a horizontal axis C3 intersecting the drawing plane at a slant. Therefore, the plate 50 attached parallel to the second support shaft 53 rotates or turns freely in the three arrow directions F1 to F3.

Figure 5:
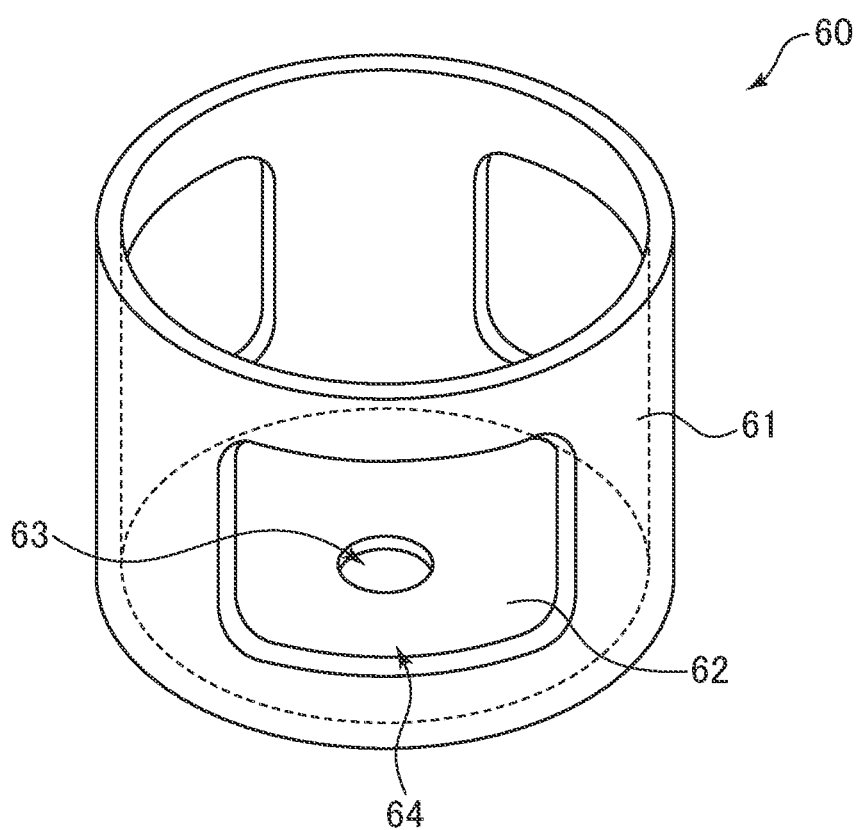
FIG. 5 is an external perspective view of the regulator.

The regulator 60 illustrated in FIG. 5 regulates the slant of the plate 50 that slants from the horizontal pose to the vertical pose. For example, the regulator 60 is designed such that the plate 50 slants in the range from the horizontal pose to a pose from which an article M falls. The angle at which the article M falls depends on the viscosity of the article M or the surface roughness of the plate 50. Thus, the angle is determined based on experiments. The regulator 60 includes a cylinder 61 large enough to house the universal joint 40 and a bottom 62 that occludes the lower opening of the cylinder 61. The bottom 62 is provided with a through hole 63 for attaching the regulator 60 to the support shaft 30.

Referring to FIG. 4, the support shaft 30 has an upper end portion provided with a bolt 32. The bolt 32 is screwed to a screw hole with which the bottom face of the rod end 31 is provided. Then, with the support shaft 30 having the bolt 32 inserted through the through hole 63 of the regulator 60, the bolt 32 is screwed to the screw hole of the rod end 31, so that the regulator 60 can be secured between the upper end face of the support shaft 30 and the bottom face of the rod end 31. Thus, the cylinder 61 of the regulator 60 has a side face provided with a window 64 for insertion of a wrench, and the support shaft 30 and the rod end 31 each have a side face provided with an I-shaped cut 33 engageable with the wrench.

The plate 50 having such a configuration as above is disposed at a position to which articles M fall. Every time an article M hits against the plate 50 supported by the universal joint 40, the orientation and slant of the plate 50 vary. Thus, each article M having hit against the plate 50 is oriented to a different direction. Even in a case where articles M fall constantly to the same position, the articles M are distributed properly around the truncated cone 12.

In addition, since the support shaft 30 that supports the plate 50 rotates around the vertical axis, the plate 50 varies in orientation based on its active rotation. Even in a case where articles M fall constantly to the same position, the plate 50 can distribute the articles M properly around the truncated cone 12.

Some embodiments of the present invention have been described above. However, the present invention is not limited to the embodiments, and thus can be carried out in modified and altered aspects without departing from the gist and scope of the present invention in the claims. For example, instead of rotation of the distribution table 11, the distribution table 11 may repeat an arc motion and an up-and-down motion in a spiral manner within a certain angle range. The universal joint 40 has the spherical sliding bearing 41 as a bearing. Instead of the universal joint 40, a universal joint having two orthogonal shafts may be adopted. Instead of the spherical sliding bearing 41 of the rod end 31, a bearing that bears a radial load may bear the second support shaft 53 such that the rod end 31 itself rotates freely around the vertical axis. Therefore, the present specification is exemplary and thus does not have any limitative meanings to the present invention.

What is claimed is:

1. A distribution supply apparatus comprising:
    a distributor configured to receive articles dropped from above and distribute the articles circumferentially;
    a plurality of conveyors arrayed radially along a circumferential edge of the distributor, the plurality of conveyors each being configured to convey, in a direction away from the distributor, an article received from among the articles from the distributor;
    a support shaft extending vertically and upward from substantially a center of the distributor;
    a plate configured to change, in contact with each of the articles to fall, a falling direction of each of the articles;
    a universal joint coupling a center of the plate and a leading end portion of the support shaft; and
    a regulator configured to regulate an angle of inclination of the plate that slants based on the universal joint, within a range from an angle at which the plate is horizontal to an angle at which each of the articles falls from the plate in a sliding manner.

2. The distribution supply apparatus according to claim 1, further comprising a second support shaft attached parallel to the plate, the second support shaft extending in a direction intersecting the support shaft, wherein the support shaft rotates together with the distributor around an axis of the support shaft, the universal joint includes a spherical sliding bearing, and the second support shaft is supported by the spherical sliding bearing.

3. The distribution supply apparatus according to claim 1, wherein
    the regulator includes:
        a cylinder through which the support shaft is inserted, the cylinder housing the universal joint, the cylinder having an upper end edge configured to regulate a slant of the plate in contact with the plate; and
        a bottom occluding a lower opening of the cylinder.

4. A combination weighing apparatus comprising the distribution supply apparatus according to claim 1 on an upper side of the combination weighing apparatus, wherein each of the plurality of conveyors includes a screw feeder including a screw, the screw feeder being configured to rotate the screw to convey the article or includes a vibration feeder including a trough, the vibration feeder being configured to vibrate the trough to convey the article.

* * * * *